Patented June 25, 1935

2,005,945

UNITED STATES PATENT OFFICE 2,005,945

EMULSION PRINTING INK AND METHOD OF MAKING SAME

Earl H. McLeod, Rutherford, N. J., assignor to The International Printing Ink Corporation, New York, N. Y., a corporation of New York No Drawing. Application December 30, 1929, Serial No. 417,589

3 Claims. (Cl. 134—36)

This invention relates to the manufacture of printing ink, and has for its particular objects the production of an ink which is non-inflammable, quick-drying and otherwise possesses excellent working qualities; is miscible with a large quantity of water to form a substantially stable emulsion which, when applied to paper, is adapted to produce excellent impressions in various shades and designs without objectionable penetration of oil through the underlying surface.

I am aware that in the Patent No. 1,524,872 an emulsified composition is disclosed which comprises a major percentage of an oil and not less than 10% of water in the vehicle carrying the pigment, but such patented product differs radically from my improved emulsion printing ink and is not at all suitable for producing the effects such as are produced by my printing ink as herein described.

In order to manufacture a printing ink embodying my invention, I preferably proceed as follows:

About 36.5 parts of rosin, preferably of the grade known as "W. W. Rosin" is dissolved in about 20 parts of a light petroleum or other hydrocarbon distillate or light hydrocarbon distillate that is a solvent for such rosin. An aqueous solution of about 2.5 parts of caustic soda (NaOH), or an equivalent amount of caustic potash (KOH), in about 11 parts of water is then prepared which is obviously considerably less than the chemical equivalent or combining weight of the rosin employed, and such solution is then intimately mixed with the dissolved rosin and the mixture is allowed to saponify preferably in the cold i. e. without additional heat being supplied thereto. Sufficient additional petroleum or other hydrocarbon distillate is then incorporated into the mixture to increase the specific gravity of the oil vehicle thereof to about .787 specific gravity, the amount of such additional distillate which is added being such that the non-aqueous vehicle aforesaid which is present in the mixture will total about 40 parts by weight. About 5 parts of a vegetable drying oil, as linseed or China-wood oil are then incorporated in the mixture. Preferably also about 5 parts of additional water is added simultaneously with the final addition of the aforesaid petroleum or other hydrocarbon distillate as thereby I obtain what I term the "vehicle" which is then employed for producing a base of the desired shade or color. For example, to obtain a heavy white base, I incorporate with said vehicle so prepared about two parts of lithopone to each part of vehicle and to obtain a light or thin pigment base the proportions are reversed, namely, about one part of lithopone to each two parts of vehicle. In lieu of part of the lithopone, clay in the form of a fine, dry powder, such as is commonly used in the production of a white base may be incorporated with the lithopone and, where extreme cheapness is desired, at least 80% or even more of the amount of lithopone which would otherwise be employed can be replaced by such clay. Likewise finely divided barium sulphate or other suitable white pigments may be substituted for part or all of the clay or lithopone, if desired. For the production of printing ink of different colors, various alkali-proof pigments, such for example as cadmium yellow, madder lake red or other similar pigments of the desired shade may be incorporated with the pigment base either by addition thereto or being employed as a substitute for part or all of the white pigment of the pigment base.

In the preparation of the aforesaid vehicle and pigment base, it is preferable to conduct the mixing operations in a ball mill as thereby the ingredients are simultaneously ground and incorporated together by a rubbing action which is far more effective than operations conducted in an ordinary mixing device employing various mechanical stirring devices. Immediately before utilizing my improved printing ink, it is desirable that the user add thereto from 10% to 100% of water by weight of finished ink, which addition can be made merely by a simple stirring operation. Such addition does not affect a correspondingly thinning down of the mixture as might be expected, since the addition of the water to the emulsion obtained in the production of my improved product, whether white or other colors, serves to bring it up to a consistency which renders it more suitable than if no additional water was incorporated with it. Furthermore, the resultant product does not tend to oxidize and form a skin on the surface of the product on standing in the container.

In my preferred ink above described, the percentage of rosin, light petroleum distillate, caustic soda (NaOH) and vegetable drying oil present in the mixture, based on the total weight of the non-aqueous ingredients, is as follows, viz:—

| | Percent |
|---|---|
| Rosin | 43.4 |
| Light petroleum distillate | 47.6 |
| Caustic soda | 2.9 |
| Vegetable drying oil | 5.9 |

Because of the high percentage of water contained in my improved printing ink and its remarkable affinity for additional water not only is the same extremely cheap to employ, but because of the tendency of the water ingredient to penetrate and evaporate, there is a tremendous increase effected in the speed of application to a surface, such as paper for example, as not only does the paper have a peculiar affinity for the water, with a consequence that the product dries much quicker thereon than in the case where varnish vehicle is present. Furthermore, as above stated, there is no objectionable oily penetration of the printing ink through the paper or other surface to which it is applied whereby not only is the printed product rendered more saleable, but in the case of wall paper for example, it has been found that the paste will adhere more readily to the non-oily rear surface of the paper. Furthermore, my improved printing ink is non-inflammable, therefore not only is the fire hazard eliminated, but it is possible to obtain a decided reduction in the insurance rates on a building, stock and machinery when employing such ink as compared with the usual inflammable materials often employed for printing ink purposes. Again, the finished appearance of a surface printed with my improved printing ink is decidedly superior to that obtainable by employing other inks procurable at anything like the same price level, as it is possible to produce all the effects of a flat or glossy oil color as well as those possessed by water colors, and thereby the artistic tone and definition is superior to that of either an oil color or water color alone. There is also eliminated a great deal of embossing troubles since there is no tendency for the emulsified rosin to adhere to the embossing rollers of the embossing machine as is a common occurrence where ordinary rosin is merely dissolved in a varnish vehicle.

The herein described printing ink is while being suitable for general use in the printing ink field peculiarly adapted for use in the intaglio or so-called rotary gravure process, since it wipes prefectly, dries quickly while being capable of spreading readily, it is highly stable and hence does not de-emulsify or break down and settle out, it yields perfect prints which are complete in all their details besides having many other highly desirable properties.

While I preferably employ about 36.5% of rosin, about 16% of water and about 40%, by weight of the petroleum or other hydrocarbon distillate in the pigment base, I may vary these proportions within considerable limits but the resin ingredient should not be less than 20% of such vehicle and sufficient to produce the desired consistency therein, while the water should exceed 10% and the mineral oils or distillates thereof or other hydrocarbon distillates present should exceed 15% of such vehicle. In lieu of part of the rosin, other saponifiable resins, as manilla or copal, for example, may be employed or the equivalent amount of their soaps may be incorporated in the vehicle.

While I preferably employ caustic soda as the saponifying agent because of its cheaper cost, nevertheless, an equivalent amount of caustic potash, another water-soluble caustic compound of an alkali-metal may, if desired, be employed in lieu thereof, especially since the total amount of the caustic alkali required in the manufacture of the ink, as compared with the total amount of the other ingredients, is so small that even the much higher cost of the caustic potash would not objectionably increase the cost of the manufacture of the ink.

Various changes within the scope of the appended claims may be made without departing from the spirit of the invention herein described.

Having thus described my invention, what I claim and desire to obtain by United States Letters Patent is:

1. An emulsion printing ink, comprising a stable aqueous emulsion that does not tend to oxide objectionably on standing in containers, is readily miscible with additional water for which it has a remarkable affinity without objectionable thinning down of the mixture; which ink, when applied to a paper surface possesses quick drying properties because of the tendency of the volatile ingredients thereof to evaporate and to penetrate into the surface to which it is applied owing to the peculiar affinity of the paper therefor, thereby materially increasing the permissible speed of application of such ink to a paper surface; which ink does not objectionably penetrate through paper to which it is applied; and which ink, when an embossing operation is employed, has no tendency to adhere to the embossing rollers; and which ink wipes readily and does not tend to de-emulsify on standing, said ink comprising essentially a pigment and a vehicle, the latter containing a resinous binder including a water-soluble resin soap and an unsaponified resin, a volatile hydrocarbon distillate that is a solvent for said resin and water, the amount of the resinous binder present in the vehicle being at least 20%, the amount of the hydrocarbon distillate present being at least 15% and the amount of the water present exceeding 10%, by weight, of the vehicle of the ink.

2. An emulsion printing ink, comprising a stable aqueous emulsion that does not tend to oxidize objectionably on standing in containers, is readily miscible with additional water for which it has a remarkable affinity without objectionable thinning down of the mixture; which ink, when applied to a paper surface possesses quick drying properties because of the tendency of the volatile ingredients thereof to evaporate and to penetrate into the surface to which it is applied owing to the peculiar affinity of the paper therefor, thereby materially increasing the permissible speed of application of such ink to a paper surface; which ink does not objectionably penetrate through paper to which it is applied; and which ink, when an embossing operation is employed, has no tendency to adhere to the embossing rollers; and which ink wipes readily and does not tend to de-emulsify on standing, said ink comprising essentially a pigment and a vehicle, the latter containing a resinous binder including a water-soluble resin soap and an unsaponified resin, a volatile hydrocarbon distillate that is a solvent for said resin, a small amount of an oil of vegetable origin and water, the amount of the resinous binder present in the vehicle being at least 20%, the amount of the hydrocarbon distillate present being at least 15%, the amount of the water present exceeding 10%, by weight, of the vehicle of the ink and the amount of such oil present being but a small fraction of the amount of the hydrocarbon distillate.

3. The method of making an emulsion printing ink, which comprises dissolving a resin in a hydrocarbon distillate that is a solvent therefor, partially but not completely saponifying such resin to form an emulsifiable binding medium by subjecting the said resin to the action of a solution of an alkali-metal hydroxide, emulsifying the partially saponified resinous binding medium so obtained with a substantial quantity of water and, at some time during the manufacture of the ink, rubbing a pigment thereinto; the amount of the resinous binding medium incorporated in the ink, based on the weight of the vehicle of the ink, being in excess of 20%, the amount of hydrocarbon distillate employed being in excess of 15% and the amount of water present in the ink being in excess of 10%.

EARL H. McLEOD.